Nov. 15, 1960
O. W. LANGHANS
2,960,197
SANDWICH STRUCTURE
Filed Oct. 7, 1958
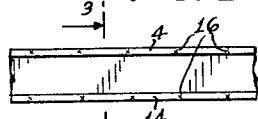
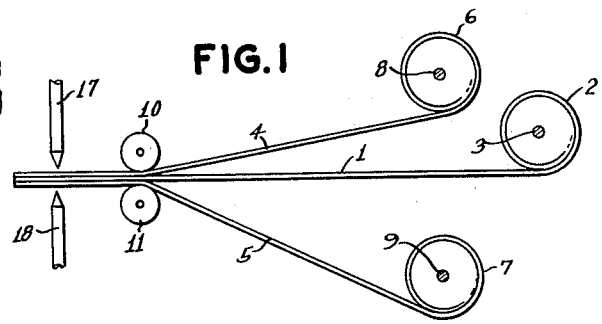
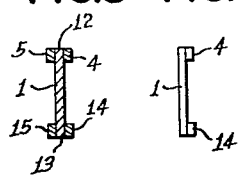
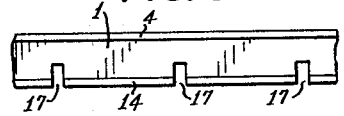
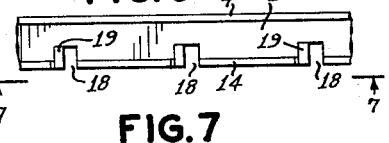
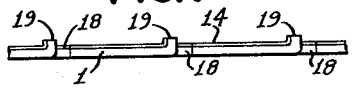
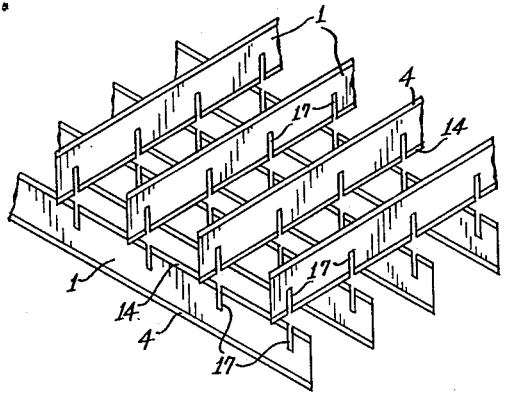
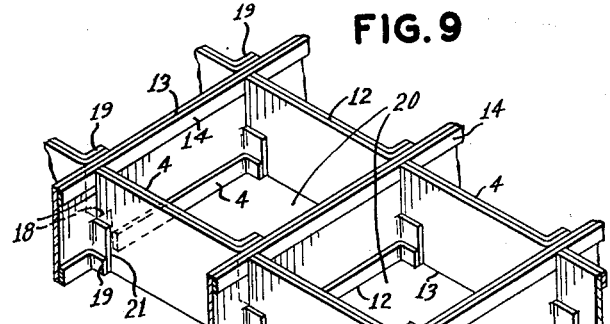
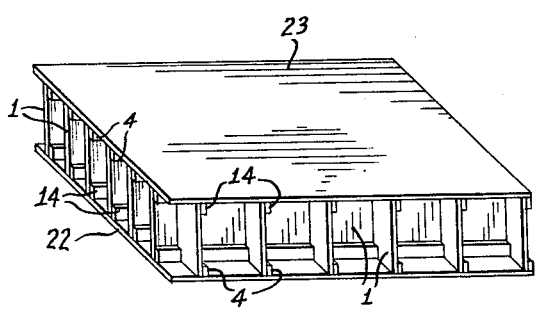
INVENTOR.
OTTO W. LANGHANS
BY
ATTORNEYS

2,960,197

SANDWICH STRUCTURE

Otto W. Langhans, Madison, N.J., assignor, by mesne assignments, to Engelhard Industries, Inc., Newark, N.J., a corporation of Delaware Filed Oct. 7, 1958, Ser. No. 765,828

3 Claims. (Cl. 189—34)

The present invention deals with a sandwich structure having a cellular core, known as honeycomb metal, and a method of manufacture thereof.

In the manufacture of cellular metal cores of the honeycomb type for sandwich structural panels or the like, a known method is to successively bond one metal strip to another at spaced intervals along the length thereof and form a stack of such bonded strips. Thereafter, the metal stack is expanded to provide interconnected cells in the form of a honeycomb. Another method is to provide a stack of metal strips with a preliminary bonding material positioned between the strip layers at longitudinally spaced intervals. The stack is subjected to bonding temperatures and pressures and after bonding it is expanded into a honeycomb structure and subsequently brazed at the honeycomb cell joints.

After forming the honeycomb core, the core is sandwiched between two metal sheets or skins covering and enclosing the cells to provide a structural panel. The usual method is to place a thin sheet of brazing metal between the skins and core and braze the assembly. Such a method has the disadvantage that the brazing metal is coextensive with the skin area and, under brazing temperatures, the excess brazing metal flows along the joints between the skins and honeycomb core and results in nodular fillets along the joints. Apart from the excess brazing metal adding to the weight of the finished panel, there is the undesirable necessity of employing sufficient controlled pressure during brazing to extrude excess brazing material from between the skins and honeycomb to assure a smooth and even skin surface. Also, the excess brazing material conducts heat and limits the effectiveness of the structure as a heat barrier.

It is an object of the present invention to provide a sandwich structure having a honeycomb core, and the method of manufacture thereof, wherein the metal for brazing the assembly is present in an optimum controlled amount only at the joint areas. It is another object of the present invention to provide a sandwich structure having a honeycomb core, wherein the assembly is brazed and characterized by uniformly brazed joints. It is a further object of the invention to provide a sandwich structure having a cellular core, wherein the sandwiching skins or sheets present a smooth surface. It is a still further object of the invention to provide a sandwich structure having a cellular core, wherein the complemental parts thereof are in a prefabricated condition and ready for assembly by a single brazing operation. Other objects and advantages of the invention will become apparent from the description hereinafter following and the drawing forming a part hereof, in which:

Figure 1 is a schematic illustration showing a method of forming a composite strip component of the structure according to the invention, Figure 2 illustrates a fragmentary top view of the composite strip component of the structure of the invention, Figure 3 illustrates a cross sectional view along the lines 3—3 of Figure 2, Figure 4 illustrates an end view of a modified composite strip, Figure 5 illustrates a fragmentary top view of a composite strip having a plurality of longitudinally spaced slots therein, Figure 6 illustrates a fragmentary top view of a modified composite strip, Figure 7 illustrates a side view along lines 7—7 of Figure 6, Figure 8 illustrates an exploded view of a plurality of slotted strips positioned for assembly into a honeycomb structure, Figure 9 illustrates a perspective fragmentary view of a modified honeycomb assembly, and Figure 10 illustrates a perspective view of a complete honeycomb assembly according to the invention.

The invention relates to a sandwich structure having a cellular core and the method of manufacture thereof, whereby the cellular core is in the form of a honeycomb formed from preformed composite metal strips comprising a brazing alloy particularly positioned for brazing the honeycomb between a pair of cell enclosing metal sheets or skins in a single brazing operation.

Regarding Figures 1 to 4, a metal strip 1 composed, for example, of austenitic or martensitic stainless steel or titanium, is provided preferably in the form of a coil 2 supported on shaft 3. Narrow bands 4 and 5 of brazing metal are provided, preferably in the form of coils 6 and 7 mounted on shafts 8 and 9, respectively. The narrow brazing metal bands 4 and 5, together with the wider metal strip 1 positioned therebetween, are passed from the coils 2, 6 and 7 between a pair of guide rolls 10 and 11 with the narrow bands 4 and 5 having their longitudinal edges vertically aligned with or in a common vertical plane with one longitudinal edge 12 of the wider strip 1, as illustrated by Figures 2 and 3. The other longitudinal edge 13 of strip 1 is similarly associated with narrow brazing metal bands 14 and 15, which may be applied simultaneously with the bands 4 and 5. The laterally spaced parallel bands positioned on the strip 1 along the longitudinal edges thereof are composed of brazing alloys such as Ag 92.5%—Cu 7.3%—Li 0.2%, Ag 85%—Mn 15%, Pd 60%—Cu 40%, or any of the well known Ni—Cr, Au—Ni, Au—Ni—Cr, Ni—Mn, Ag—Pd, Ag—Pd—Mn and similar brazing alloys. The bands on opposite sides of the strip 1 are preferably preliminarily secured to the strip by spot welding, as at 16, as they pass between welding electrodes 17 and 18.

The composite strip may be modified by the provision of the parallel bands 4 and 14 on only one side of the strip 1, as illustrated by Figure 4.

Having provided the composite strips according to Figures 2 or 4, the strips are notched or slotted with notches or slots 17 spaced longitudinally of the strip through the longitudinal edge thereof and extending substantially midway across the width of the strips, as illustrated by Figure 5. A plurality of the strips according to Figure 5 are made into predetermined lengths and a honeycomb according to Figure 8 is assembled by positioning the strips cross-wise of each other with the slots of one strip facing those of one another. The slots of one strip are engaged with that of a cross-wise strip, whereby the strips are interlocked with each other forming a plurality of cells in the form of a honeycomb. The slots 17, being formed substantially mid-way through the width of the strips permit the positioning of the strips in such a manner that longitudinal edges 12 and 13 thereof are substantially in a common plane as illustrated in the modified form of the invention according to Figure 9, hereinafter more particularly described.

Regarding Figures 6 and 7, the preformed strips are modified to provide for a plurality of longitudinally spaced slots 18 by slitting the strips 1, at the location of the slots 18, substantially mid-way through the width of the strip and bending the metal adjacent the slot to form the slots 18 with tab 19 extending outwardly of the strip 1.

Having provided the composite strip according to Figures 6 and 7 a plurality of the strips are made into pre-determined lengths and a honeycomb structure according to Figure 9 is assembled by positioning the strips cross-wise of each other with the slots 18 of one strip engaging those of another strip, whereby the strips are interlocked with each other forming a plurality of cells 20. The tabs 19, when the strips are formed into a honeycomb as illustrated in Figure 9, abut the sides of an adjacent interlocked strip, as at 21, whereby the tabs function as braces to more securely maintain rigidity of the honeycomb and strengthen the structure against stress and strain. On assembly of the honeycomb, the sides 12 and 13 are positioned substantially in a common plane and illustrated.

After the honeycomb structure has been prepared, it is sandwiched between a pair of sheets or skins 22 and 23, according to Figure 10, with the sheets enclosing or covering the cells 20. Since the longitudinal edges of the bands 4, 5, 14 and 15 are in a common plane with the longitudinal edges 12 and 13 of strip 1, the skins 22 and 23 are positioned in contact with the surfaces of edges 12 and 13 and the finished structure is brazed, for example, by heat treating in a furnace under suitable atmosphere conditions in known manner. During brazing, since an optimum amount of brazing is provided by properly dimensioning the bands 4, 5, 14 and 15, the molten brazing alloy wets and flows between the interconnecting joints between the skins 22 and 23 and edges 12 and 13, as well as the joints between the interlocked strips 1.

It is therefore apparent that the entire assembly including strips and skins are simultaneously brazed with a single brazing operation.

While the invention is described in accordance with the particular illustrations, various modifications are contemplated within the scope of the appended claims.

What is claimed is:

1. The method of forming a sandwich structure comprising forming a composite strip by securing laterally spaced parallel narrow metal bands of brazing metal on a wider metal strip with each band adjacent a longitudinal edge thereof, forming a plurality of slots spaced along the longitudinal edge of the composite strip, positioning a plurality of the composite slotted strips cross-wise of each other with the slots of one strip facing the slots of another strip, engaging the slots and interlocking the strips in the form of a honeycomb, sandwiching the honeycomb between a pair of metal sheets and subjecting the sandwich structure to brazing conditions, whereby the brazing metal flows between and brazes the joints of the sandwich structure.

2. A prefabricated sandwich structure comprising a plurality of metal strips each having laterally spaced parallel narrow bands of brazing metal secured thereon with the bands positioned adjacent the longitudinal edges thereof, a plurality of slots spaced along the longitudinal edge of each strip, the strips being positioned cross-wise of each other with the slots engaging each other and interlocking the strips in the form of a cellular honeycomb, the honeycomb being bonded between a pair of sheets covering the honeycomb cells.

3. A prefabricated sandwich structure comprising a plurality of metal strips each having laterally spaced parallel narrow bands of brazing metal secured thereon with the bands positioned adjacent the longitudinal edges thereof, a plurality of slots spaced along the longitudinal edge of each strip, the strips being positioned cross-wise of each other with the slots engaging each other and interlocking the strips in the form of a cellular honeycomb, a tab member extending outwardly of the strips adjacent each slot, the tabs of one strip abutting an adjacent strip and forming a brace therefor, the honeycomb being bonded between a pair of sheets covering the honeycomb cells.

References Cited in the file of this patent

UNITED STATES PATENTS

| | | |
|---|---|---|
| 1,022,387 | Czimeg | Apr. 2, 1912 |
| 2,778,458 | Briggs | Jan. 22, 1957 |
| 2,816,355 | Herman | Dec. 14, 1957 |

FOREIGN PATENTS

| | | |
|---|---|---|
| 723,621 | Great Britain | Feb. 9, 1955 |

OTHER REFERENCES

Plastics, pp. 64, 65 and 66, October 1949.